United States Patent

Cymbal

Patent Number: 5,570,610
Date of Patent: Nov. 5, 1996

[54] ADJUSTABLE STEERING COLUMN

[75] Inventor: William D. Cymbal, Freeland, Mich.

[73] Assignee: General Motors Corporation, Detroit, Mich.

[21] Appl. No.: 497,572

[22] Filed: Jun. 30, 1995

[51] Int. Cl.$^6$ ........................................................ B62D 1/18
[52] U.S. Cl. .................................................. 74/493; 74/531
[58] Field of Search ............................ 74/493, 531, 497; 280/775

[56] References Cited

U.S. PATENT DOCUMENTS

| | | | |
|---|---|---|---|
| 4,472,982 | 9/1984 | Nishikawa | 74/493 |
| 4,732,050 | 3/1988 | Vollmer | 74/493 |
| 5,052,240 | 10/1991 | Miyoshi et al. | 74/493 |
| 5,161,425 | 11/1992 | Baskett et al. | 74/493 |
| 5,361,646 | 11/1994 | Venable | 74/493 |
| 5,481,938 | 1/1996 | Stuedemann et al. | 74/493 |

*Primary Examiner*—Charles A. Marmor
*Assistant Examiner*—David Fenstermacher
*Attorney, Agent, or Firm*—Saul Schwartz

[57] ABSTRACT

An adjustable motor vehicle steering column having a stationary mast jacket, a tilt-housing supported on the stationary mast jacket for up and down pivotal movement, a steering wheel rotatably supported on the tilt-housing, a friction clamp for infinite tilt adjustment, and a wedge lock to prevent upward pivotal movement of the tilt-housing in the event the friction clamp is overpowered. The wedge lock includes an arc-shaped land on the tilt-housing, a locking ring having an eccentric outer edge rotatably supported on the stationary mast jacket concentric with the arc-shaped land, and a torsion spring biasing the locking ring toward engagement of the eccentric outer edge thereof on the arc-shaped land. If the friction clamp is overpowered, the arc-shaped land effects rotation of the locking ring to a wedged position against the land at the onset of pivotal movement of the tilt-housing in which further pivotal movement of the tilt-housing is foreclosed. The operating lever forcibly rotates the locking ring in a direction separating its eccentric outer edge from the arc-shaped land when the friction clamp is open and releases the locking ring when the friction clamp is closed.

4 Claims, 3 Drawing Sheets

5,570,610

ADJUSTABLE STEERING COLUMN

FIELD OF THE INVENTION

This invention relates to adjustable motor vehicle steering columns.

BACKGROUND OF THE INVENTION

In common tilt-adjustable motor vehicle steering columns, the vertical position of a steering wheel relative to a driver seated in the vehicle is adjusted by pivoting a tilt-housing on which the steering wheel is rotatably supported up and down about a lateral centerline. A lock shoe on one of a stationary mast jacket of the steering column and the tilt-housing has a plurality of notches which seat on a pin on the other in discrete vertical positions of the steering wheel. A positive attribute of this construction is that it successfully resists angular displacement of the tilt-housing even when substantial forces are applied to the steering wheel urging upward pivotal movement of the tilt-housing. A less positive attribute of this construction is that it provides only as many adjusted positions of the steering wheel as there are notches in the lock shoe. Other tilt-adjustable motor vehicle steering columns have been proposed in which infinite adjustability is achieved by a clamp which induces friction between moveable and stationary elements of the steering column. Practical embodiments of such friction clamps, however, do not match the positive retention performance of the aforesaid lock shoe construction when the tilt-housing is forced upward.

SUMMARY OF THE INVENTION

This invention is a new and improved adjustable motor vehicle steering column having a stationary mast jacket, a tilt-housing supported on the stationary mast jacket for up and down pivotal movement, a steering wheel rotatably supported on the tilt-housing, a friction clamp for infinite tilt adjustment, and a wedge lock to prevent upward pivotal movement of the tilt-housing in the event the friction clamp is overpowered. The friction clamp has inner and outer jaw elements which clamp together relatively moveable surfaces on the stationary mast jacket and on the tilt-housing when an operating lever is pivoted from an unlocked position to a locked position. The wedge lock includes an arc-shaped land on the tilt-housing, a locking ring having an eccentric outer edge rotatably supported on the stationary mast jacket concentric with the arc-shaped land, and a torsion spring biasing the locking ring toward engagement of the eccentric outer edge thereof on the arc-shaped land. If the friction clamp is overpowered, the arc-shaped land effects rotation of the locking ring to a wedged position against the land at the onset of pivotal movement of the tilt-housing in which further pivotal movement of the tilt-housing is foreclosed. The operating lever forcibly rotates the locking ring in a direction separating its eccentric outer edge from the arc-shaped land when the friction clamp is open and releases the locking ring when the friction clamp is closed.

DESCRIPTION OF A PREFERRED EMBODIMENT

Figure 1:
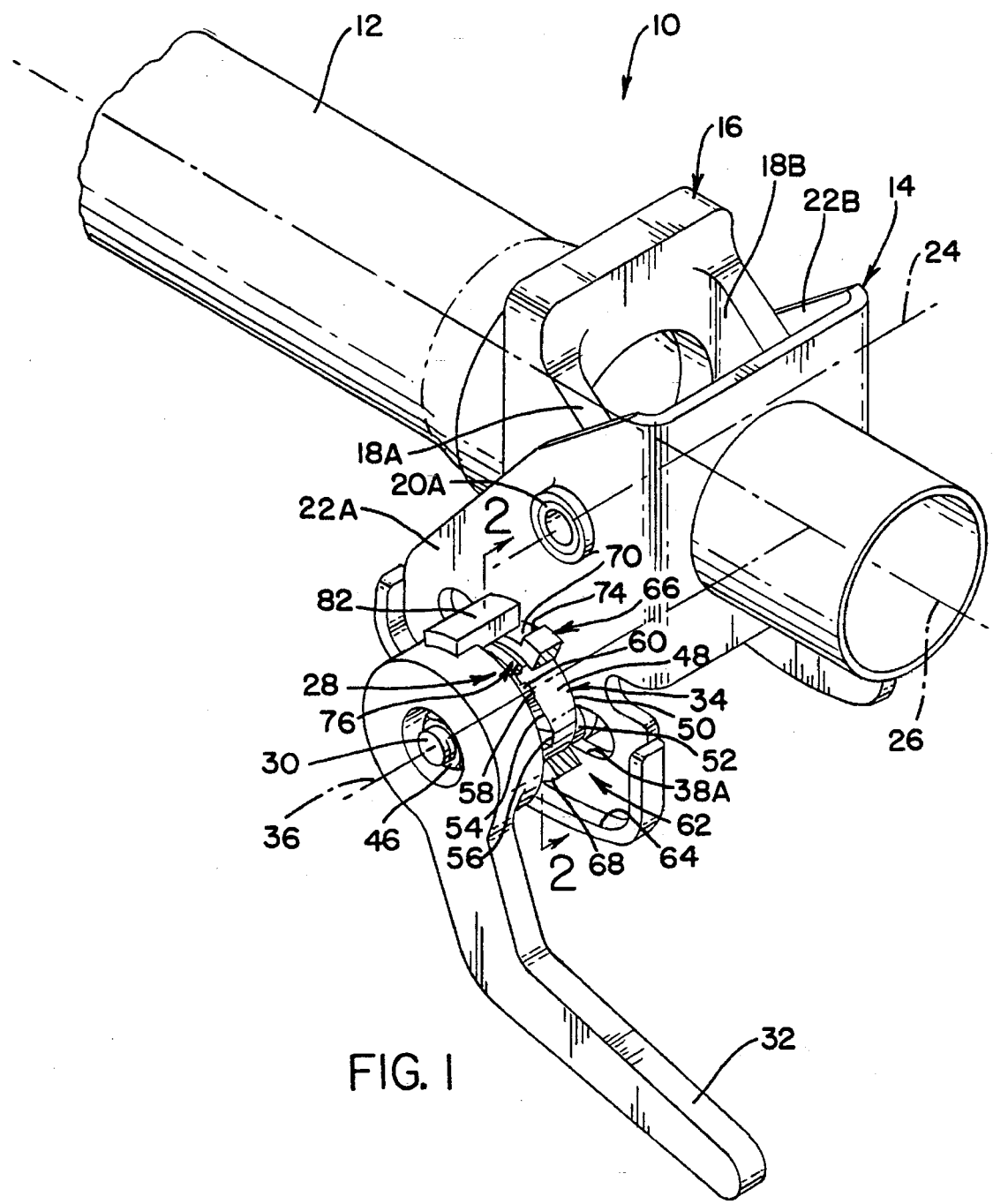
FIG. 1 is a fragmentary, partially broken-away, perspective view of an adjustable motor vehicle steering column according to this invention.

An adjustable motor vehicle steering column 10 according to this invention includes a tubular mast jacket 12 and a tilt-housing 14. A yoke 16 having a pair of integral bosses 18A–B is rigidly attached to the mast jacket 12. A pair of pivot pins 20A–B respective ones of a pair of sidewalls 22A–B of the tilt-housing 14 engage journals, not shown, on the bosses 18A–B whereby the tilt-housing is supported on the mast jacket for up and down pivotal movement about a first lateral centerline 24 of the steering column. A steering wheel, not shown, is supported on the tilt-housing for rotation about a longitudinal centerline 26 of the tilt-housing. The vertical position of the steering wheel relative to an operator seated in a passenger compartment of the motor vehicle is adjusted by up and down pivotal movement of the tilt-housing.

A friction clamp 28 between the tilt-housing 14 and the yoke 16 includes a shaft 30, an operating lever 32, and cam 34. The shaft 30 is supported on the bosses 18A–B in alignment with a second lateral centerline 36 of the steering column and traverses the sidewalls 22A–B of the tilt-housing 14 through respective ones of a pair of arcuate slots 38A–B in the sidewalls the centers of curvature of which coincide with the first lateral centerline 24.

A thrust washer 40 on the shaft 30 is disposed between a bolt head 42 at one end of the shaft and the sidewall 22B of the tilt-housing. The other end of the shaft 30 is received in a bore 44 in the operating lever whereby the operating lever is supported on the yoke 16 for pivotal movement about the second lateral centerline 36 between a locked position, FIG. 2, and an unlocked position, not shown, about 45°–90° clockwise from the locked position. A nut 46 retains the operating lever on the shaft 30.

The cam 34 is rotatably supported on the shaft 30 between the sidewall 22A of the tilt-housing and the operating lever and includes an outer cylindrical wall 48, a flat side 50 facing the sidewall 22A of the tilt-housing, and a lug 52 on the flat side. The lug projects into the arcuate slot 38A and cooperates with the shaft 30 in preventing rotation of the cam 34 relative to the yoke 16 about the second lateral centerline 36 without interfering with up and down pivotal movement of the tilt-housing.

The cam 34 has a plurality of arcuate ramps 54 on the side thereof opposite the flat side 50. Each of the ramps extends between a lower platform 56 and an upper platform 58. The operating lever 32 has a plurality of followers 60 thereon corresponding to the number of ramps 54 on the cam. The followers 60 bear against the cam and traverse the ramps 54 between the upper and lower platforms concurrent with pivotal movement of the operating lever between its locked and unlocked positions. The flat side 50 of the cam and the thrust washer 40 define a pair of outer jaw elements of the friction clamp outside of the sidewalls 22A–B of the tilt-housing 14. The bosses 18A–B define a pair of inner jaw elements of the friction clamp inside of the sidewalls 22A–B.

In the unlocked position of the operating lever 32, not shown, the cam followers 60 seat on the lower platforms 56 and the friction clamp is open, i.e. separation between the inner and outer jaw elements of the clamp is maximum and the tilt-housing 14 is freely pivotable up and down about the first lateral centerline. When the operating lever 32 is pivoted from its unlocked position to its locked position, FIGS. 2–3, the cam followers 60 traverse the ramps 54 from the lower platforms 56 to the upper platforms 58 and the friction clamp is closed, i.e. separation between the inner and outer jaw elements is minimum and the sidewalls 22A–B of the tilt-housing are squeezed against the bosses 18A–B, respectively. Friction thus induced between the sidewalls and the bosses immobilizes the tilt-housing relative to the stationary mast jacket in any position of the tilt-housing.

Figure 4:
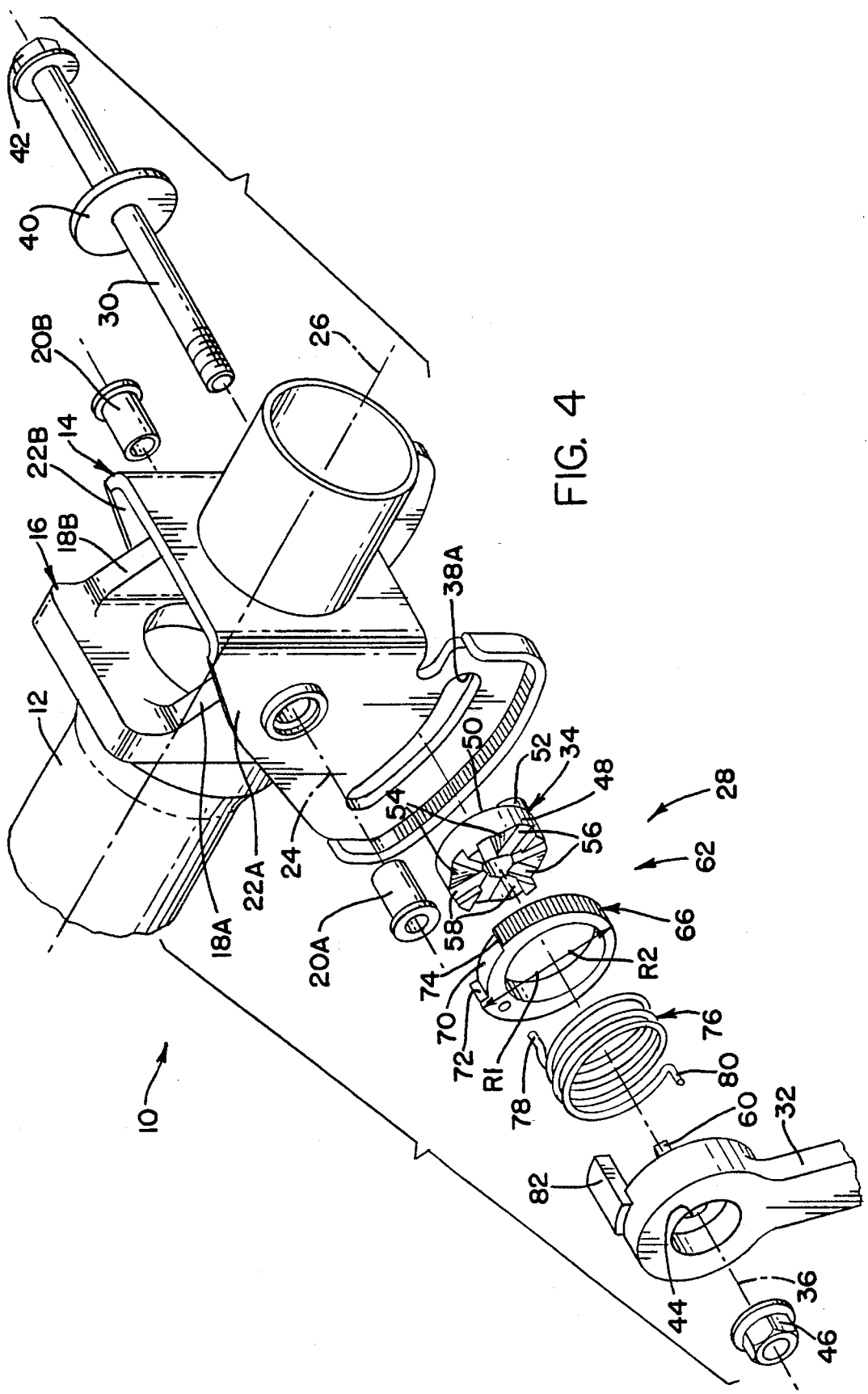
FIG. 4 is a fragmentary, exploded, perspective view of the adjustable motor vehicle steering column according to this invention.

A wedge lock 62 includes an arc-shaped land 64 on the tilt-housing 14 at the bottom of the sidewall 22A concentric with the arcuate slot 38A and an annular locking ring 66 supported on the outer cylindrical wall 48 of the cam 34 for rotation about the second lateral centerline 36. The locking ring 66 has an eccentric outer edge 68 the radius of which from the center of the ring varies from a maximum $R_1$ to a minimum $R_2$, FIG. 4. The eccentric outer edge 68 is interrupted by a notch 70 having a first shoulder 72 at one end and a second shoulder 74 at the other end.

A coil torsion spring 76 is disposed around the shaft 30 between the operating lever 32 and the cam 34 and includes a first hooked end 78 projecting into a socket in the locking ring and a second hooked end 80 projecting into a socket in the operating lever. The torsion spring 76 biases the locking ring counterclockwise, FIGS. 1–2. A rigid tang 82 on the operating lever outside of the torsion spring 76 extends into the notch 70 between the shoulders 72,74.

Figure 2:
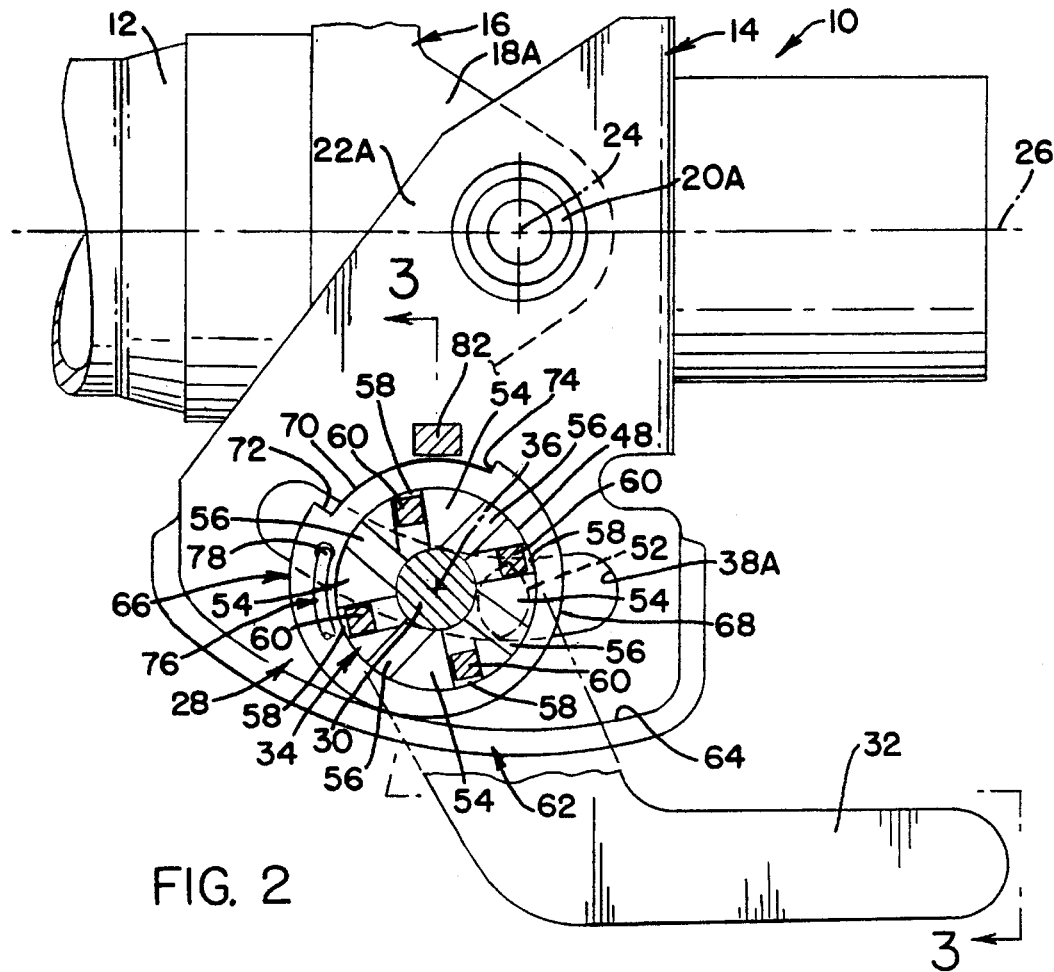
FIG. 2 is a partially broken-away view taken generally along the plane indicated by lines 2—2 in FIG. 1.
Figure 3:
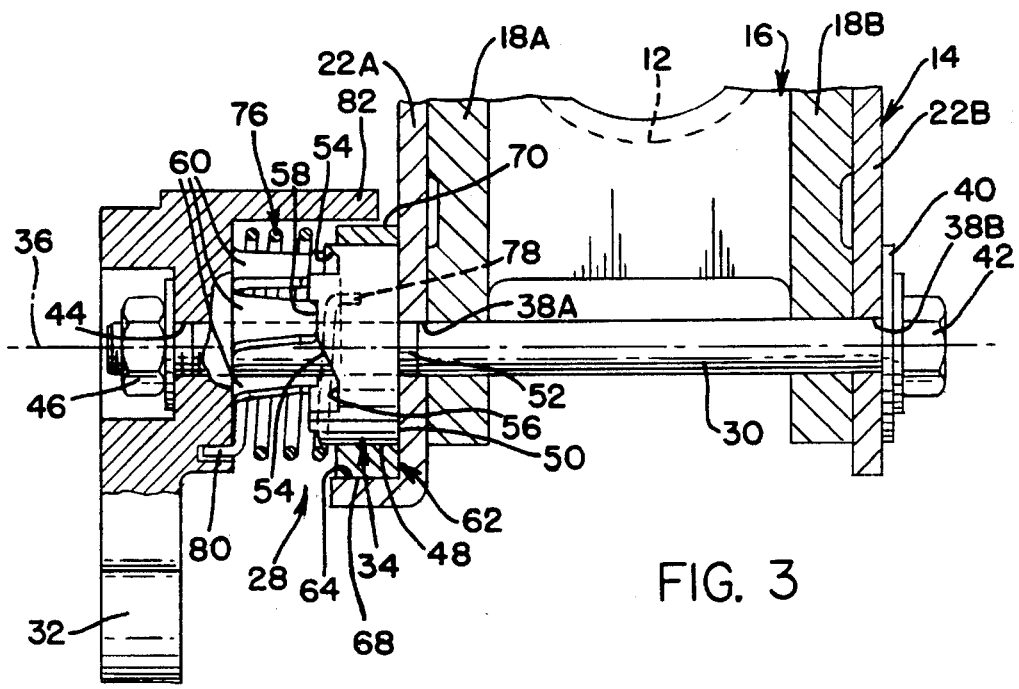
FIG. 3 is a partially broken-away sectional view taken generally along the plane indicated by lines 3—3 in FIG. 2.

In the locked position of the operating lever 32, FIG. 2, the rigid tang 82 is about midway between the first and second shoulders 72,74 of the notch 70 and the torsion spring 76 rotates the locking ring counterclockwise, FIG. 2, until the eccentric outer edge 68 thereof seats against the arc-shaped land 64. In that circumstance, if the tilt-housing 14 experiences an upward force of sufficient magnitude to overpower the friction clamp 28, the arc-shaped land 64 rotates the locking ring 66 toward a wedged position between the cam 34 and the land concurrently with the onset of upward pivotal movement of the tilt-housing 14. In its wedged position, the locking ring 66 induces substantial friction between the locking ring and each of the cam 34 and the arc-shaped land 64 which effectively immobilizes the tilt-housing 14 and prevents further upward pivotal movement of the layer. In an alternate embodiment, not shown, the eccentric outer edge 68 and the arc-shaped land 64 may have meshing teeth or serrations thereon to positively rotate the locking ring to its wedged position.

When the operating lever 32 is pivoted clockwise, FIG. 2, from its locked position to its unlocked position, the friction clamp transitions from closed to open. Concurrently, the rigid tang 82 on the operating lever 32 engages the second shoulder 74 of notch 70 after a few degrees of pivotal movement of the operating lever and forcibly rotates the locking ring 66 clockwise to separate the eccentric outer edge 68 of the locking ring from the arc-shaped land 64. With the eccentric outer edge separated from the arc-shaped land, the wedge lock is immobilized and the tilt-housing 14 is freely pivotable up and down. When a comfortable position of the steering wheel is achieved, the control lever is pivoted from its unlocked position to its locked position to concurrently close the friction clamp and reestablish engagement of the eccentric outer edge 68 of the locking ring on the arc-shaped land 64.

I claim:

1. A motor vehicle steering column having a mast jacket, a tilt-housing supported on said mast jacket for up and down pivot movement about a first lateral centerline of said steering column, and a friction clamp operative to squeeze together a surface on said tilt-housing and a surface on said mast jacket to induce friction therebetween in response to pivotal movement of an operating lever about a second lateral centerline of said steering column from an unlocked position to a locked position, characterized in that said steering column further includes a wedge lock comprising:

an arc-shaped land on said tilt-housing having a center of curvature coinciding with said first lateral centerline, a locking ring having an eccentric outer edge, means supporting said locking ring on said stationary mast jacket for rotation about said second lateral centerline, actuating means biasing said locking ring in a first direction of rotation to a position in which said eccentric outer edge bears against said arc-shaped land in said locked position of said operating lever and from which said locking ring is rotated further in said first direction by said arc-shaped land in response to upward pivotal movement of said tilt-housing to a wedged position against said arc-shaped land preventing further upward pivotal movement of said tilt-housing, and releasing means operative in response to pivotal in said operating lever from said locked position to said unlocked position to rotate said locking ring in a second direction of rotation opposite to said first direction of rotation to a position in which said eccentric outer edge is remote from said arc-shaped land.

2. The motor vehicle steering column recited in claim 1 wherein said actuating means comprises:

a coil torsion spring having a first end connected to said operating lever and a second end connected to said locking ring biasing said locking ring in said first direction of rotation.

3. The motor vehicle steering column recited in claim 2 wherein said releasing means comprises:

a shoulder on said locking ring, and a rigid tang on said operating lever juxtaposed said shoulder on said locking ring in said locked position of said control lever and engaging said shoulder on said locking ring during pivotal movement of said operating lever from said locked position to said unlocked position to rotate said locking ring in said second direction of rotation to said position in which said eccentric outer edge is remote from said arc-shaped land.

4. The motor vehicle steering column recited in claim 3 wherein said wedge lock further comprises:

a plurality of meshing tooth means on said eccentric outer edge of said locking ring and on said arc-shaped land operative to effect positive rotation of said locking ring in said first direction of rotation to said wedged position in response to upward pivotal movement of said tilt-housing.

* * * * *